(12) United States Patent
O'Neill et al.

(10) Patent No.: US 7,832,188 B2
(45) Date of Patent: Nov. 16, 2010

(54) APPARATUS AND METHOD FOR SEALING A LIDSTOCK TO A CONTAINER

(76) Inventors: Trevor F. O'Neill, 15 Ard Na Groi, Tramore, County Waterford (IE); Anthony O'Neill, Stoney Cove, Cove Park, Tramore, County Waterford (IE); Michael W. Murphy, Dal Riada, Woodstown Upper, County Waterford (IE); Patrick J. Tobin, 2 Magenta Close, Grange Manor, Waterford (IE); John R. Coppinger, 45 Carraig Heights, Ard Na Shee, Gracedieu, County Waterford (IE); Patrick D. O'Neill, Dispensary Lane, Rathcormac, County Cork (IE)

( * ) Notice: Subject to any disclaimer, the term of this patent is extended or adjusted under 35 U.S.C. 154(b) by 95 days.

(21) Appl. No.: 12/282,174

(22) PCT Filed: Dec. 21, 2006

(86) PCT No.: PCT/EP2006/070117

§ 371 (c)(1),
(2), (4) Date: Sep. 9, 2008

(87) PCT Pub. No.: WO2007/104371

PCT Pub. Date: Sep. 20, 2007

(65) Prior Publication Data
US 2009/0045080 A1 Feb. 19, 2009

(30) Foreign Application Priority Data
Mar. 15, 2006 (GB) ................................ 0605238.5

(51) Int. Cl.
*B65B 51/10* (2006.01)
(52) U.S. Cl. ..................... 53/478; 53/133.7; 53/471; 53/485

(58) Field of Classification Search ................ 53/137.7, 53/471, 477, 478, 485, 287, 284.5, 329.2, 53/329.3, 133.7
See application file for complete search history.

(56) References Cited

U.S. PATENT DOCUMENTS 3,726,106 A * 4/1973 Jaeger .......................... 62/294

(Continued)

FOREIGN PATENT DOCUMENTS

WO WO 97/28716 8/1997

(Continued)

*Primary Examiner*—Hemant M Desai
(74) *Attorney, Agent, or Firm*—Glenn D. Smith (57) ABSTRACT

The invention relates to a method for heat sealing a lidstock (9) to a container (1) for a blister package, the container having a top surface comprising a substantially flat sealing flange (3) surrounding a blister (2) and a lip (4) having at least one raised surface (6), the method comprising the steps of a) locating the lidstock on the top surface; b) providing a first seal between the lidstock and the at least one raised surface of the lip with a first heat sealing tool (11); c) providing a second hermetic seal between the lidstock and the sealing flange surrounding the blister with a second heat sealing tool. The invention also relates to a package for storing a hydrophilic contact lens comprising a lip having at least one raised surface and a removable lidstock sealed to a sealing flange and to the at least one raised surface. Also disclosed is an apparatus for heat sealing the lidstock to the container.

19 Claims, 6 Drawing Sheets

U.S. PATENT DOCUMENTS

| | | | |
|---|---|---|---|
| 4,409,252 A * | 10/1983 | Buschkens et al. | 426/396 |
| 4,687,116 A * | 8/1987 | Dutt et al. | 220/270 |
| 4,691,820 A | 9/1987 | Martinez | |
| 5,524,419 A | 6/1996 | Shannon | |
| 5,578,331 A | 11/1996 | Martin et al. | |
| 5,649,410 A | 7/1997 | Martin et al. | |
| 5,722,536 A | 3/1998 | Pierce et al. | |
| 6,082,533 A * | 7/2000 | Smith et al. | 206/210 |
| 7,404,994 B2 * | 7/2008 | Stevenson | 428/35.7 |

FOREIGN PATENT DOCUMENTS

WO    WO 2006/032829 A1    3/2006

* cited by examiner

APPARATUS AND METHOD FOR SEALING A LIDSTOCK TO A CONTAINER

This application claims the benefit under 35 U.S.C. Section 371, of PCT International Application No. PCT/EP2006/070117, filed Dec. 21, 2006, which claimed priority to United Kingdom Application No. 0605238.5, filed Mar. 15, 2006.

The invention is concerned with methods for sealing lidstock to containers to form blister packages, particularly disposable blister packages for contact lenses. The invention is further concerned with a package for storing a hydrophilic contact lens.

Soft hydrogel contact lenses have been increasing in popularity ever since they were first introduced in the 1970's. Such contact lenses are conventionally packaged in the hydrated state and in a storage solution. Currently, many contact lenses are packaged, along with the aqueous storage solution, in a disposable blister package typically formed from container of a rigid polymer sealed with a lidstock. Examples of blister packages can be seen in U.S. Pat. Nos. 4,691,820; 5,524,419; 5,578,331; 5,649,410; 5,722,536, 6,082,533 and WO2006/032829. The container forming the base of a blister package can either be part of the original contact lens mold or a separately molded base, typically formed from a rigid polymer. In the above mentioned package types, the container that holds the contact lens and any aqueous storage solution, is sealed by a flexible lidstock. This lidstock is typically a laminated foil which can be pulled back by a user to access the lens contained in the blister of the container. Typically, this lidstock is sealed to the area or flange of the top surface of the container surrounding the blister. This sealing area of the container is typically a substantially flat surface area, or a raised flattened annular surface as seen, for example, in U.S. Pat. No. 5,722,536. The preferred blister package with which the method of the present invention is used is that disclosed in WO 2006/032829.

In order to facilitate the removal of the lidstock from the package by the user, the top surface of the container is provided with a lip spaced from the sealing flange on the top surface of the package. The lidstock is left unsealed over part of this lip to provide a finger lift such that the user may grasp the unattached lidstock over the lip and use this portion to tear the lidstock from the rest of the package in order to access the contents of the blister.

Because the lidstock is not sealed to the lip, there may be problems in handling and providing secondary packaging for the disposable blister packages, as this unattached portion of the lidstock is prone to being inadvertently folded back from the lip.

There are also problems with the reliable positioning of the lidstock over the container prior to forming the hermetic seal around the blister, as the lidstock may become misplaced as the package, prior to sealing, is moved between the different stations of an automated packaging machine.

According to a first aspect of the invention, there is provided a method for heat sealing a lidstock to a container for a blister package, the container having a top surface comprising a substantially flat sealing flange surrounding a blister and a lip, the method comprising the steps of:
a) locating the lidstock on the top surface,
b) providing a first seal between the lidstock and a locus of the lip with a first heat sealing tool,
c) providing a second hermetic seal between the lidstock and the sealing flange surrounding the blister with a second heat sealing tool.

The first seal is not over the entire lip, but only at a locus of the lip such that the user may still grasp an unsealed part of the lidstock to facilitate the removal of the lidstock from the package.

The first seal has the advantages that the lidstock is held in position immediately after placement of the lidstock before being moved to the second sealing station for hermetic sealing of the contents of the blister. It also gives the advantage that the unsealed portion of the lidstock is less susceptible to accidental folding back during subsequent processing of the package.

The method is particularly advantageous when the lip has a curved upper surface, curved downwards with respect to the sealing flange, in order to provide a gripping surface for the user when opening the blister package. The first seal holds the lidstock in place over the curved upper surface of the lip during subsequent manufacturing process steps, but does not compromise the ease of opening of the blister pack by the user, as there is still an unsealed region of the lidstock over the lip for the user to grasp.

The container is suitably moulded from a rigid polymer, for example, a thermoplastic polymer such as polypropylene or polystyrene. The container comprises a well or blister for holding the material to be packaged, such as a soft contact lens with hydrating solution, and has a flange around the well to which the lidstock is sealed to form the sealed package. The flange may simply be part of the top surface of the package itself, or may be in the form of a raised area surrounding the well and provided on the top surface of the package. The sealing surface of the flange may be all or part of the upper surface of the rim, provided that the sealing surface surrounds the blister such that when a seal is made, the contents of the blister are hermetically sealed.

The container may start as a flat sheet of polymer and then be moulded simply to form a well, leaving the remaining top surface surrounding the blister as the flange of the well.

The container may be a more complex moulding such as that disclosed in WO 97/28716 or WO 2006/032829, where the container is provided with a plurality of legs and has a blister towards one end of the surface of the container and a substantially flat lip region towards the other end of the surface of the container. Preferably, the container is that disclosed in WO 2006/032829.

Preferably, the lip of the container is curved downwards, suitably in a smooth curve starting from near the flange and ending towards an edge of the lip remote from the sealing flange. The lip may be provided with a multiple curve, for instance having more than one mutually orthogonal radii of curvature. The lip, whether flat or curved, may also be provided with a hole or cutout to facilitate lifting the lidstock from the lip by pushing through the hole or cutout from below when the user wishes to open the blister package.

The first seal is suitably at a locus spaced from the sealing flange and spaced from an edge of the lip, such that there is still an unattached portion of lidstock adjacent to the edge of the lip to act as a finger lift allowing the user to grasp the unattached portion to facilitate opening of the container.

It is preferred that the first seal has a fracture strength which is less than the fracture strength of the second seal. If the fracture strength of the first seal is greater than that of the second seal, it may be difficult to exercise control when opening the container, possibly leading to accidental spillage of contents. Hence it is advantageous if the first seal has a fracture strength which is less than that of the second seal to prevent such spillage, requiring the user to increase the applied force in order to open the second seal after the first seal has fractured. The difference in the strength of the seals may be achieved by using a pressure and/or temperature and/or contact time applied in forming the first seal which is less than the pressure and/or temperature and/or contact time applied in forming the second seal.

The first seal is simply a means of locating that portion of the lidstock to the flange and it does not need to be a hermetic seal.

In order to facilitate the tearing of the first seal, it is preferred that the first seal comprises one or more mutually spaced spot welds. By the term, "spot weld" is meant a weld in the form of a small dot, suitably 10 mm$^2$ or less in area, preferably 7 mm$^2$ or less in area, more preferably 5 mm$^2$ or less in area. In order to provide ease of tearing combined with reliable holding of the lidstock in place on the lip, it is preferred that the first seal comprises at least two mutually spaced spot wells, preferably consisting of two mutually spaced spot welds.

The first seal may be provided at a first station of a packaging line, and the second seal provided at a second station of the packaging line. Preferably, the first seal is provided at the same station as the station where the lidstock is placed or located on the top surface of the package, such that the risk of displacement of the lidstock in subsequent movement is minimized. The packaging line is preferably an automated packaging line.

In order for the first seal to be made, when the lip of the container has a downwardly curved surface, it is preferred that the first heat sealing tool comprises a sealing plate adapted to contact the lidstock over the curved surface of the lip at a tangent to provide the first seal. The sealing plate may be a flat plate or may be provided with locally heated portions to provide spot welds for the first seal.

Preferably, the first heat sealing tool is rotated about a pivoting means such as an axle or hinge, to bring it into contact with the lidstock over the raised surfaces of the lip to from the first seal. This allows the placement and formation of the first seal to take place conveniently at a single station.

The sealing plate of the first heat sealing tool is preferably provided with a temperature sensor whereby the temperature of the sealing plate during the formation of the first seal may be monitored or controlled. This assists with the control of the fracture strength of the first seal.

The second sealing tool for forming the second seal, hermetically sealing the lidstock to the sealing flange of the container suitably has a lower face which supports the container directly below the flange, and an upper face which presses the lidstock against the surface sealing surface of the flange of the package. Typically, the upper face is heated, at least in the sealing region, in order to provide a seal by melting a basal thermoplastic layer of the lidstock to the sealing surface of the rim.

According to a preferred embodiment of the method of the invention, step (b) of the method includes the step of providing a first seal between the lidstock and at least one raised surface provided on the lip of the container.

Thus, the first seal is formed only at the at least one raised surface of the lip. The method of the invention has the advantage that it requires that the first sealing tool is at a temperature which is lower than that heretofore required, thereby prolonging the operating life of the tool. Furthermore, the method of the invention results in minimized cosmetic damage to the lidstock during formation of the first seal.

Ideally, the at least one raised surface is integrally formed with the container.

Preferably, the lip has two mutually spaced raised surfaces.

The provision of the raised surface(s) on the lip provides the advantage that cosmetic damage to the lidstock laminated foil is minimized during the first sealing operation because the first heat sealing tool makes contact with a minimal surface area, namely only the raised surfaces on the lip. This enables a reduction in the operating temperature required for the first sealing operation and so improves the operating life of the first heat sealing tool.

According to a further aspect of the invention, there is provided a package for storing a hydrophilic contact lens comprising:

a base having a top surface and a recess well having a perimeter in the top surface for storing a hydrophilic contact lens, said top surface comprising a substantially flat sealing flange surrounding the recessed well and a lip having at least one raised surface; and a removable lidstock sealed to said sealing flange and to the at least one raised surface of said lip.

Preferably, the lip has two mutually spaced raised surfaces. The raised surfaces of the lip provide the advantages as described previously for the first aspect of the invention.

Preferably, the lip of the container is curved downwards, suitably in a smooth curve starting from near the flange and ending towards an edge of the lip remote from the sealing flange. The lip may be provided with a multiple curve, for instance having more than one mutually orthogonal radii of curvature. The lip, whether flat or curved, may also be provided with a hole or cutout to facilitate lifting the lidstock from the lip by pushing through the hole or cutout from below when the user wishes to open the package.

The package may take the form of a blister package for contact lens.

In a further aspect, the present invention provides a sealing apparatus for heat sealing a lidstock to a container for a blister package, the sealing apparatus comprising a support arm for supporting at least one sealing surface, the apparatus also including means for heating.

Preferably, the at least one sealing surface comprises an elongate sealing surface including a plurality of spaced apart channels provided along the elongate sealing surface, defining a plurality of sealing surfaces.

Ideally, each of the plurality of heated surfaces includes individual heating means for individually heating each of the plurality of sealing surfaces.

The invention will now be further described, by way of example only, with reference to the accompanying drawings, in which.

Figure 1:
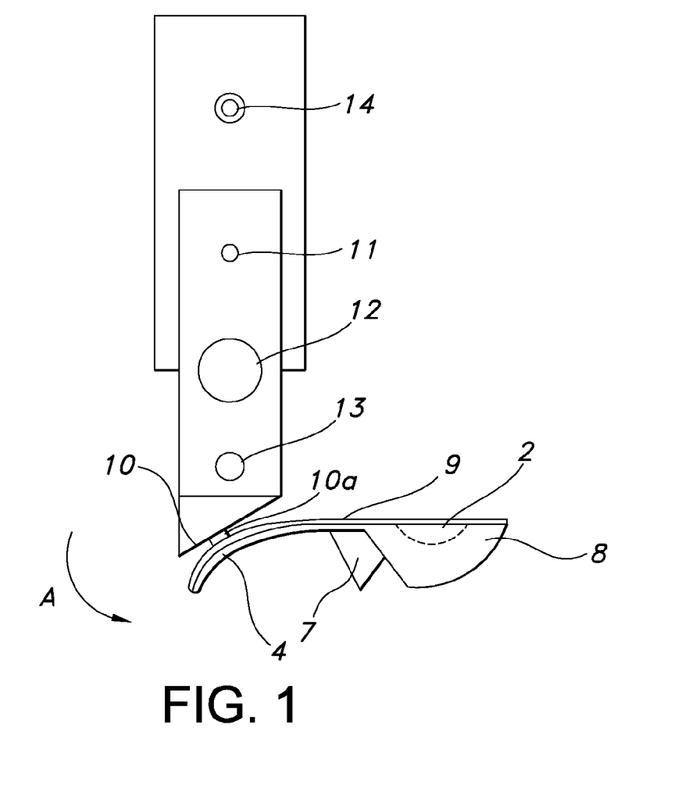
FIG. 1 is a side view of a first embodiment of the first seal being formed on a blister package.
Figure 2:
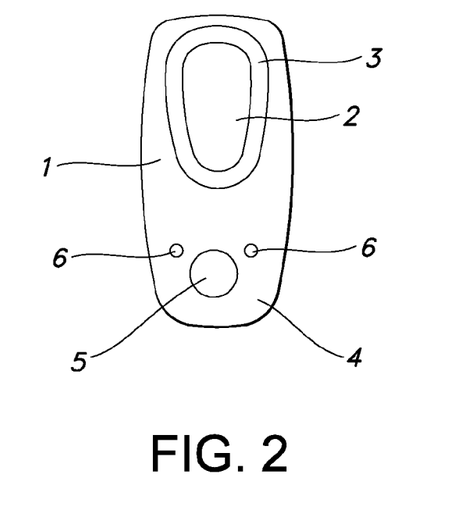
FIG. 2 is a plan view of the top surface of a container forming the base of a blister package showing the locations of the first seal formed by spot welds in the first embodiment; and the second seal, with lidstock removed.

Referring initially to FIGS. 1 and 2, a first embodiment of the container is indicated generally by reference numeral 1. The top surface of the container 1 is provided with a blister 2 surrounded by a sealing flange 3 where the second seal is located. The lip 4 of the container is downwardly curved and is provided with a hole 5. As shown in FIG. 2, the first seal is formed by two spot welds 6.

FIG. 2 shows that the container 1 has legs 7,8 such as are provided on the container described in WO 97/28716 and WO 2006/032829. The lidstock 9 is located over the top surface of the container 1. The first heat sealing tool 11 is shown in FIG. 1 with the sealing plate 10 in contact with the lidstock 9 over the curved lip 4 so as to form the two spot welds 6 that provide the first seal in the first embodiment. The first heat sealing tool includes two individual electrical heating elements (not shown) for forming the two spot welds 6. Two staking points 10*a* provided on the sealing plate 10 are used to form the spot welds 6. The first heat sealing tool 11 has a pivot 14 about which the whole tool can be rotated by a pneumatic cylinder or a servo motor, and is further provided with a heater 12 and a sensor 13 for monitoring the temperature at the sealing plate.

In use, the first heat sealing tool is rotated from a rest position remote from the container, about the pivot 14, by a pneumatic cylinder or a servo motor, in direction A, until the heated sealing plate 10, heated by the heater 12, comes into contact with the lidstock 10 to form the first seal comprising the two spot welds 6. After a predetermined time, the first heating tool is then rotated back to its rest position. The package is then relocated to the next station where the second seal is formed.

Referring now to FIGS. 3, 4, 5, 6, 7, 8 and 8*a*, a second embodiment of the container is shown in which the first seal is formed in an alternative way. The container in this second embodiment is indicated generally by reference numeral 21. Like features are indicated using like numerals.

The container 21 includes two raised surfaces 26, 26' which are integrally formed on the container 21. The raised surfaces 26, 26' are approximately 2 mm$^2$ in area. The container 21 and the two raised surfaces 26, 26' are ideally formed of plastics material, preferably polypropylene.

Figure 3:
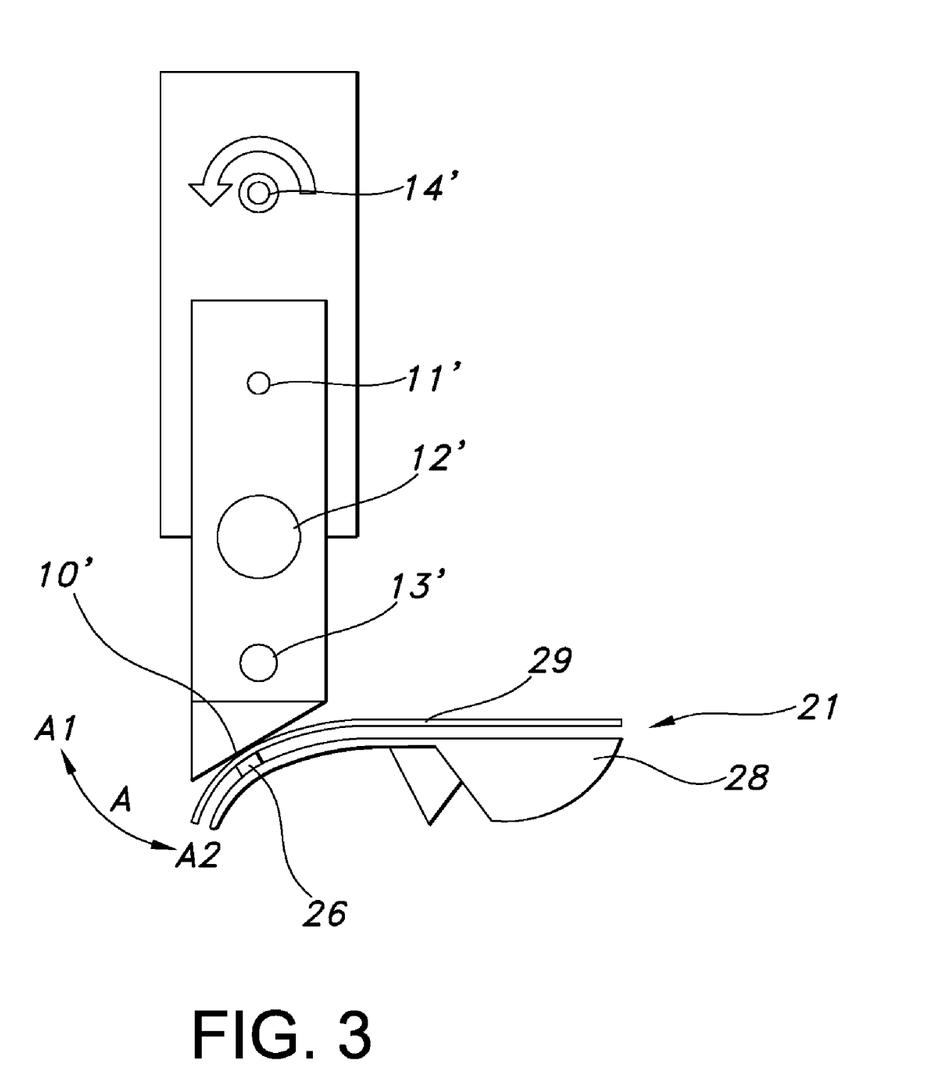
FIG. 3 is a side view of a second embodiment of the first seal being formed on a container.
Figures 4, 6:
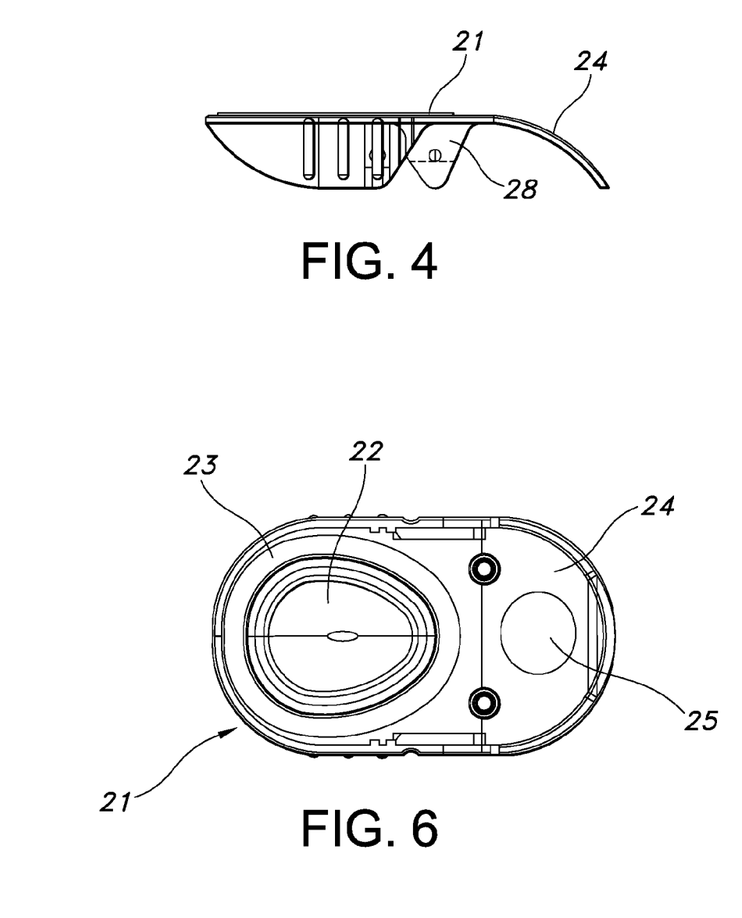
FIG. 4 is a side perspective view of the container used in the method shown in FIG. 3 with lidstock removed.
FIG. 6 is a plan view of the top surface of the container of FIGS. 4 and 5, forming the base of a blister package, with the lidstock removed.
Figures 5, 7:
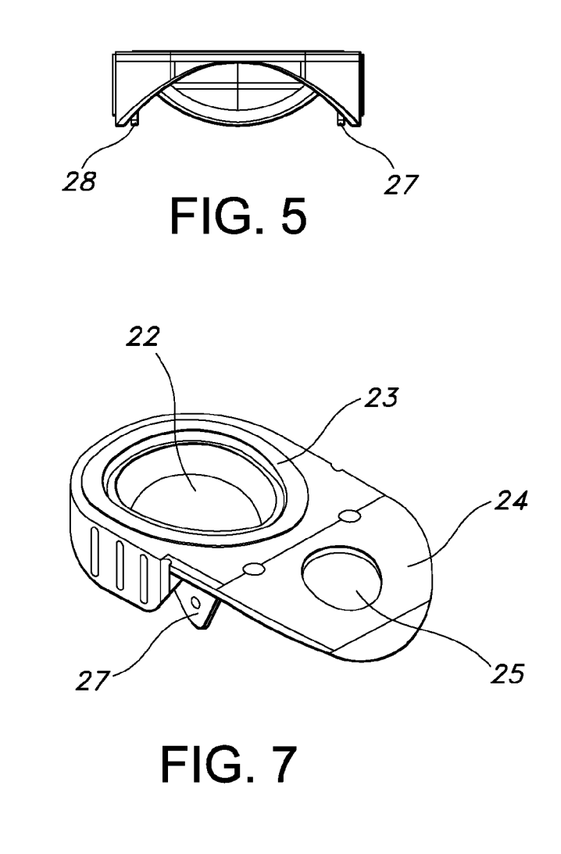
FIG. 5 is a rear view of the container of FIG. 4 with lidstock removed.
FIG. 7 is a top perspective view of the container of FIGS. 4 to 6, with lidstock removed.
Figure 8:
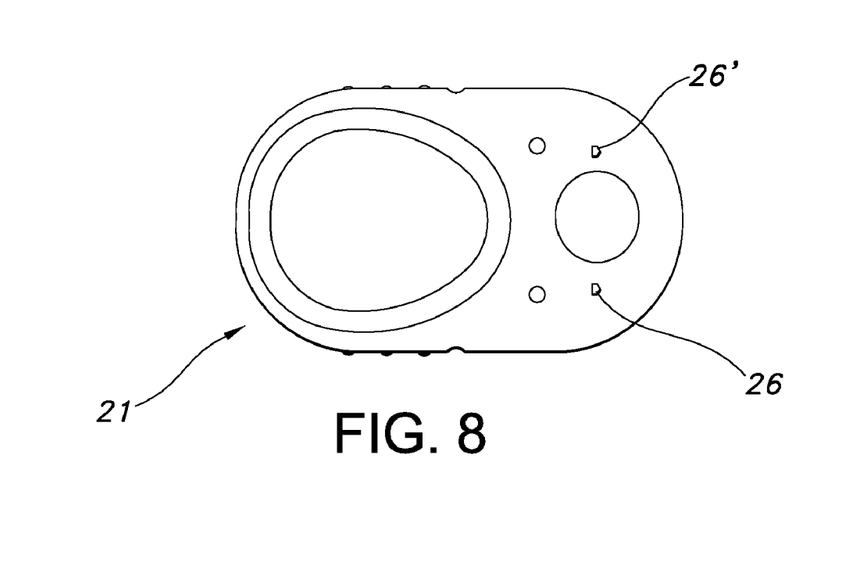
FIG. 8 is a plan view of the top surface of the container as shown in FIG. 6 but with the generally triangular-shaped raised areas indicated.
Figure 8A:
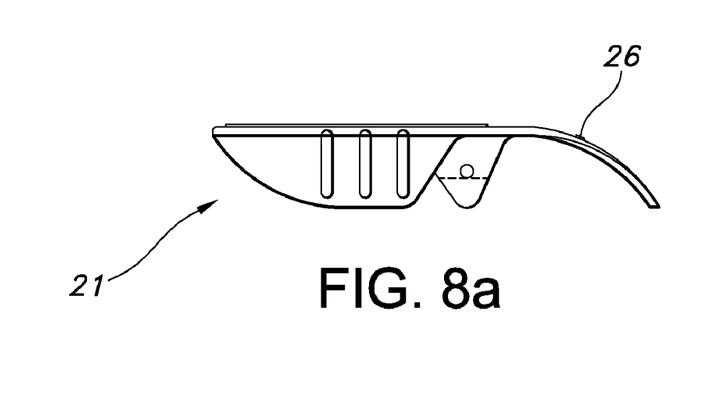
FIG. 8*a* is a side view of the container of FIG. 8.

In FIG. 3, the first heat sealing tool 11' is shown with the planar sealing plate 10' in contact with the lidstock 29 over the two raised surfaces 26 provided on the curved lip 24 to form the first seal. The first heat sealing tool 11' has a pivot 14' about which the whole tool can be turned by a pneumatic cylinder or a servo motor, in an arcuate movement in the directions A1, A2 of arrow A. The first heat sealing tool 11' is provided with a heating element 12' for heating the sealing plate 10' and a temperature sensor 13' for monitoring the temperature of the sealing plate 10'.

In use, the first heat sealing tool is turned, from a rest position remote from the container, about the pivot 14' by a servo motor in direction A2 of arrow A, until the heated sealing plate 10', heated by the heating element 12', comes into contact with the lidstock 29 over the two raised surfaces 26, 26' to form the first seal. The first sealing tool applies an axial force to two spot areas of the lidstock, in a direction tangential to the two raised surfaces 26, 26' on the curved surface of the lip 24. The aforementioned two spot areas of the lidstock are the areas located immediately over the two raised surfaces 26, 26' on the lip 24 of container 21. Thus, the first sealing tool forms a first seal through the application of heat to the two mutually separate spot areas of the lidstock which, during sealing, are sandwiched between the sealing plate 10 and the two raised areas 26, 26' on the lip 24. The two raised surfaces 26, 26' at least partially melt as a result of the heat applied by the sealing plate 10 and the melted plastics material forms a seal between the lidstock and the container 21. Thus, the raised surfaces 26, 26' are "sacrificial" in the sense that they melt (at least partially) to form the first seal between the lidstock and the container 21 without giving up any of the body of the lip 24 and without causing any cosmetic damage to the container 21. When the desired pressure and time is reached at the set temperature as monitored by the sensor 13', the arcuate movement of the heat sealing tool, in the direction of arrow A2, is stopped and after a predetermined time, the first heat sealing tool is then moved back to its rest position. The container 21 is then transferred to the next station where the second seal is formed.

Figure 9:
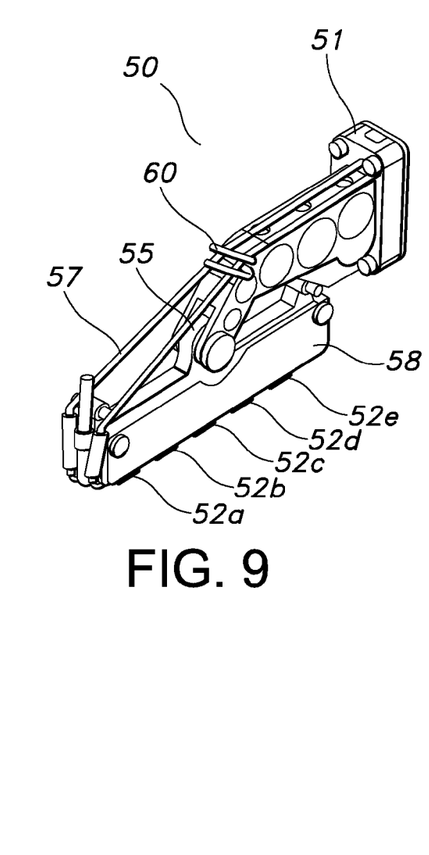
FIG. 9 is a perspective view of a first staking tool, in a preferred embodiment, shown assembled.
Figure 9A:
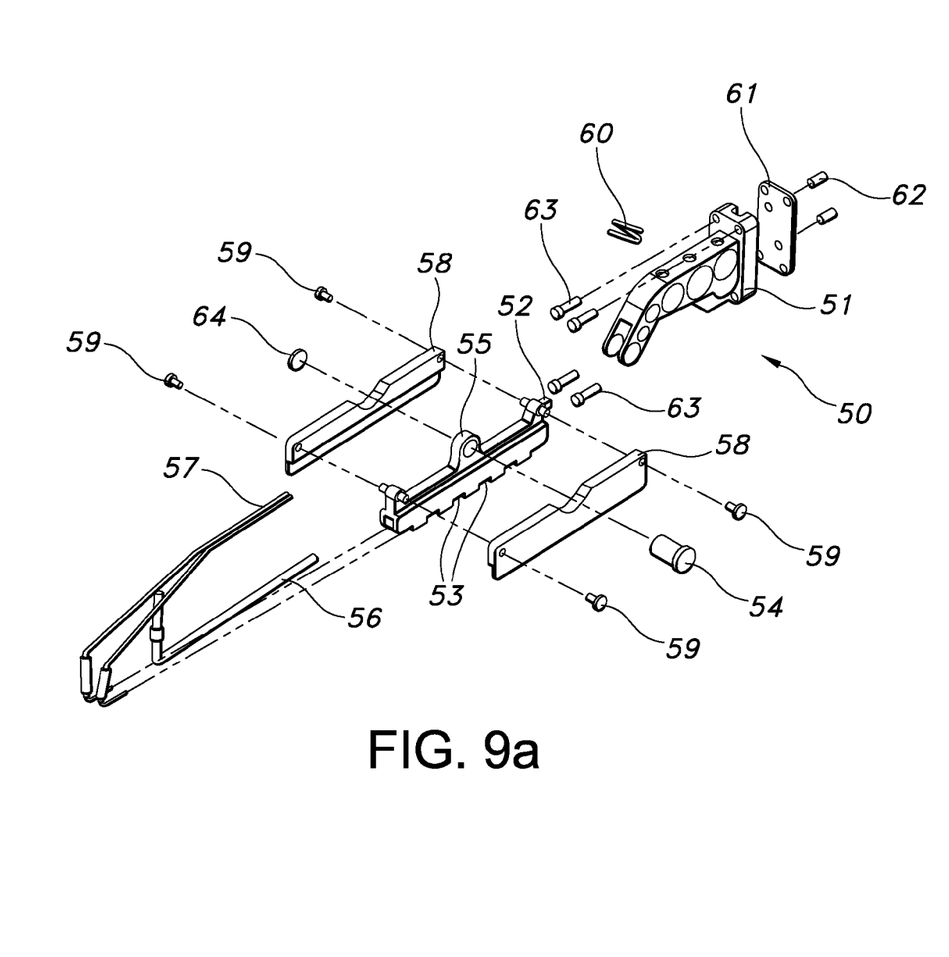
FIG. 9*a* is a perspective view of the first staking tool shown in FIG. 6, with the components of the staking tool shown disassembled.

Referring now to FIGS. 9 and 9*a*, a preferred embodiment of the first sealing apparatus for forming a first seal of the lidstock to the curved lip 4 of the containers 1 and 21, is shown. The first sealing apparatus can be used to form the first seal comprising the spot welds on container 1 and can also be used to form the first seal by melting the raised surfaces 26, 26' on the container 21, thereby forming the seal between the lidstock and the container 21.

As shown in FIGS. 9 and 9*a*, the apparatus is indicated generally by reference numeral 50 and comprises a fixed arm 51, a thermal staking head 52 having a ring 54 through which a pin 53 may be inserted. The arm 51 functions as a support for the thermal staking head 52.

Fitted longitudinally through the thermal staking head 52 is a heating element 55. A thermocouple 56 is also included in the assembly. The apparatus 50 also includes two insulators 58, one insulator 58 provided at each side of the thermal staking head 52. The apparatus 50 also includes four pan head bolts 59 for securing the two insulators 58 to the thermal staking head 52. The tool 50 also includes a coiled cable holder 60, a shim 61, two dowels 62, four bolts 63 as well as a circlip 64 (preferably of stainless steel).

The thermal staking head 52 includes a plurality (four in this preferred embodiment) of spaced apart channels 53 provided transversely across the thermal staking head 52, thereby defining a plurality of staking head sealing surfaces 52(*a*), 52(*b*), 52(*c*), 52(*d*) and 52(*e*).

Each of these staking head sealing surfaces 52(*a*), 52(*b*), 52(*c*), 52(*d*) and 52(*e*) provides a heated sealing plate so that the apparatus 50 can be used to form the first seal on a plurality of lidstocks on a plurality of containers 1, formed in an array. The position of each of the five sealing surfaces 52(*a*), 52(*b*), 52(*c*), 52(*d*) and 52(*e*) is accurately positioned over an array of five containers 1 by controlling the positioning of the sealing surfaces 52(*a*), 52(*b*), 52(*c*), 52(*d*) and 52(*e*) using the support arm.

Figure 10:
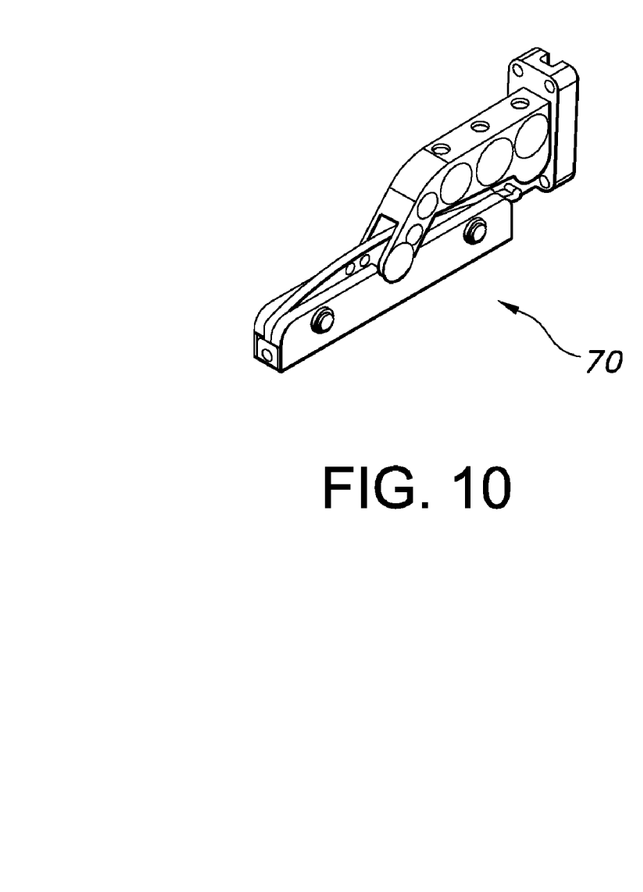
FIGS. 10 and 10*a* are perspective views (corresponding to FIGS. 6 and 6*a* respectively) of an alternative embodiment of first heat sealing tool; the tool in this embodiment is similar to that shown in FIGS. 6 and 6*a* except that the thermal staking head includes holes in the embodiment shown in FIGS. 7 and 7*a*.
Figure 10A:
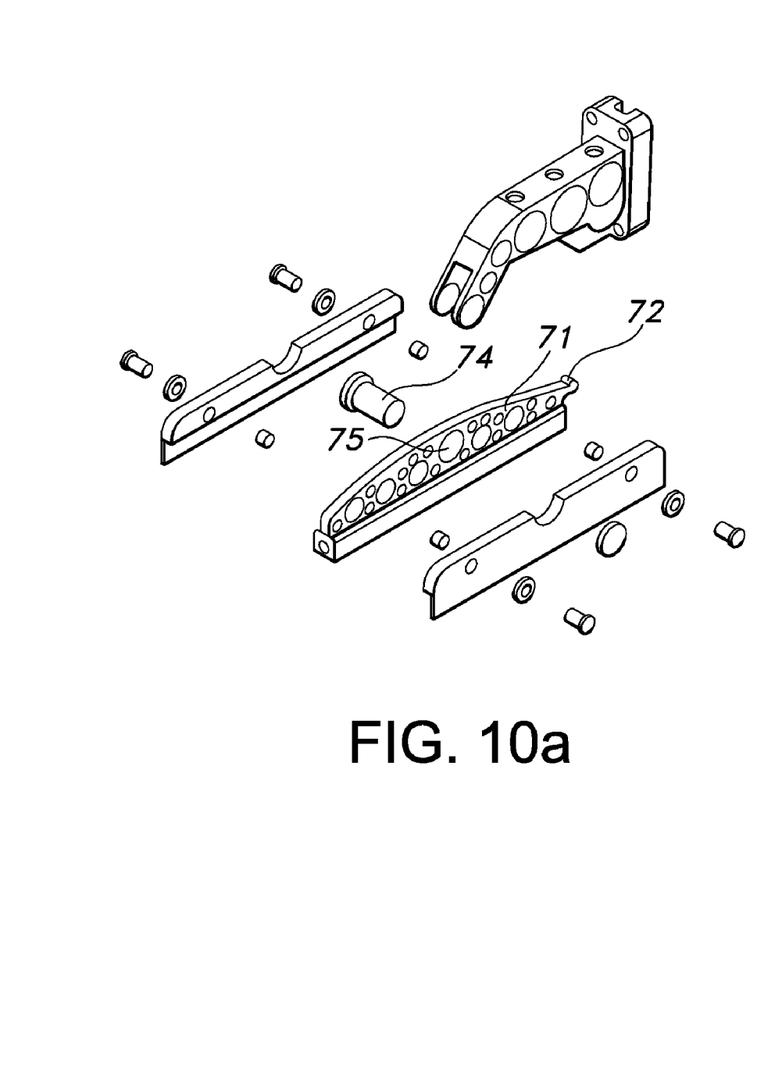

Referring now to FIGS. 10 and 10*a*, an alternative embodiment of sealing apparatus is shown. Like numerals are used to describe like parts. The sealing apparatus in this embodiment is indicated generally by reference numeral 70. The sealing apparatus 70 shown in FIGS. 10 and 10*a* differs from apparatus 50 shown in FIGS. 9, 9*a* in that the thermal staking head 72 of apparatus 70 includes a raised shoulder portion 71 which includes a plurality of holes which act as heat sinks.

Another difference between apparatus 50 and apparatus 70 is that the ring 55 on the staking head 52 is replaced by a hole 75 on the shoulder 71 through which pin 74 may be inserted.

It is to be understood that the invention is not limited to the specific details described above which are given by way of example only and that various modifications and alterations are possible without departing from the scope of the invention, as defined in the appended claims.

The invention claimed is:

1. A method for heat sealing a lidstock to a container for a blister package, the container having a top surface comprising a substantially flat sealing flange surrounding a blister and a lip the method comprising the steps of:
   a) locating the lidstock on the top surface;
   b) providing a first seal between the lidstock and a locus of the lip with a first heat sealing tool;
   c) providing a second hermetic seal between the lidstock and the sealing flange surrounding the blister with a second heat sealing tool.

2. A method according to claim 1 wherein the lip has at least one raised surface and at step (b), the method comprises providing the first seal between the lidstock and the at least one raised surface on the lip.

3. A method according to claim 2 wherein the at least one raised surface comprises a substantially triangular shaped surface.

4. A method according to claim 2, wherein the lip has two mutually spaced raised surfaces.

5. A method according to claim 1, wherein the lip has a curved upper surface, curved downwards with respect to the sealing flange.

6. A method according to claim 1, wherein the lidstock is a laminated foil comprising a metal layer and a basal thermoplastic polymer layer.

7. A method according to claim 6, wherein the basal thermoplastic polymer layer is polypropylene.

8. A method according to claim 1, wherein the first seal is spaced from the sealing flange and spaced from an edge of the lip.

9. A method according to claim 1, wherein the first seal comprises one or more mutually spaced spot welds.

10. A method according to claim 9, wherein the area of each spot weld is 10 mm$^2$ or less.

11. A method according to claim 1, wherein the first seal comprises two mutually spaced spot welds.

12. A method according to claim 1, wherein the pressure and/or temperature and/or contact time applied in forming the first seal is less than the pressure and/or temperature and/or contact time applied in forming the second seal.

13. A method according to claim 1, wherein the fracture strength of the first seal is less than the fracture strength of the second seal.

14. A method according to claim 1, wherein the blister package is for a contact lens.

15. A method according to claim 1, wherein the first seal is provided at a first station of a packing line, and the second seal is provided at a second station of the packing line.

16. A method according to claim 1, wherein the first heat sealing tool comprises a sealing plate to provide the first seal and wherein the sealing plate is adapted to contact the lidstock over the raised surfaces of the lip at a tangent to provide the first seal.

17. A method according to claim 1, wherein the first heat sealing tool is rotated about a pivoting means to bring the sealing plate into contact with the lidstock over the raised surfaces of the lip to provide the first seal.

18. A method according to claim 1, wherein the sealing plate is provided with a temperature sensor whereby temperature during formation of the first seal may be monitored and/or controlled.

19. A method according to claim 1, wherein the raised surfaces of the lip are of polypropylene.

* * * * *